March 1, 1960 E. E. WHITE 2,926,505
TRACTION DRIVE FOR RAILROAD-TRANSPORTED REFRIGERATOR TRAILERS
Filed Aug. 21, 1958 2 Sheets-Sheet 1
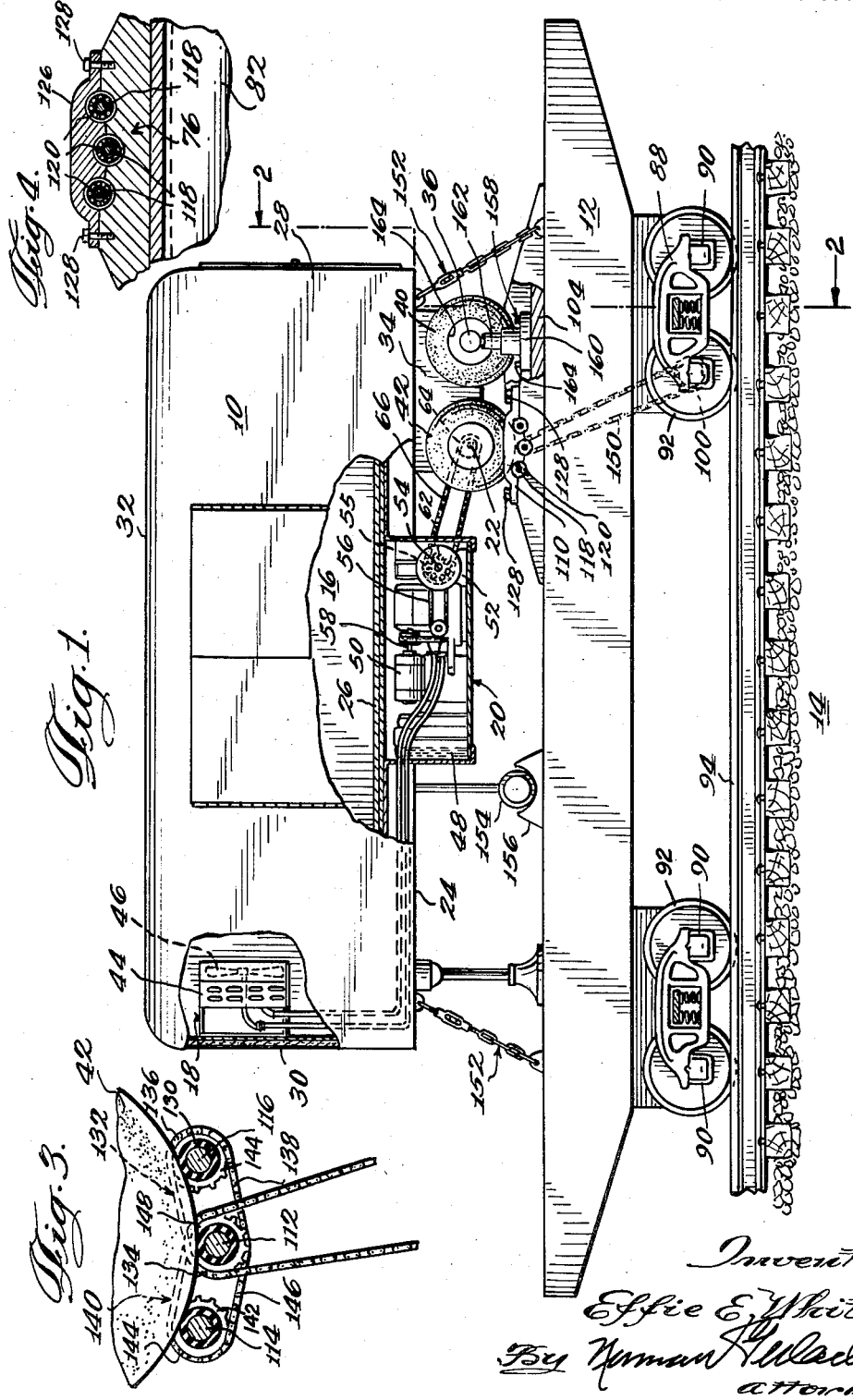

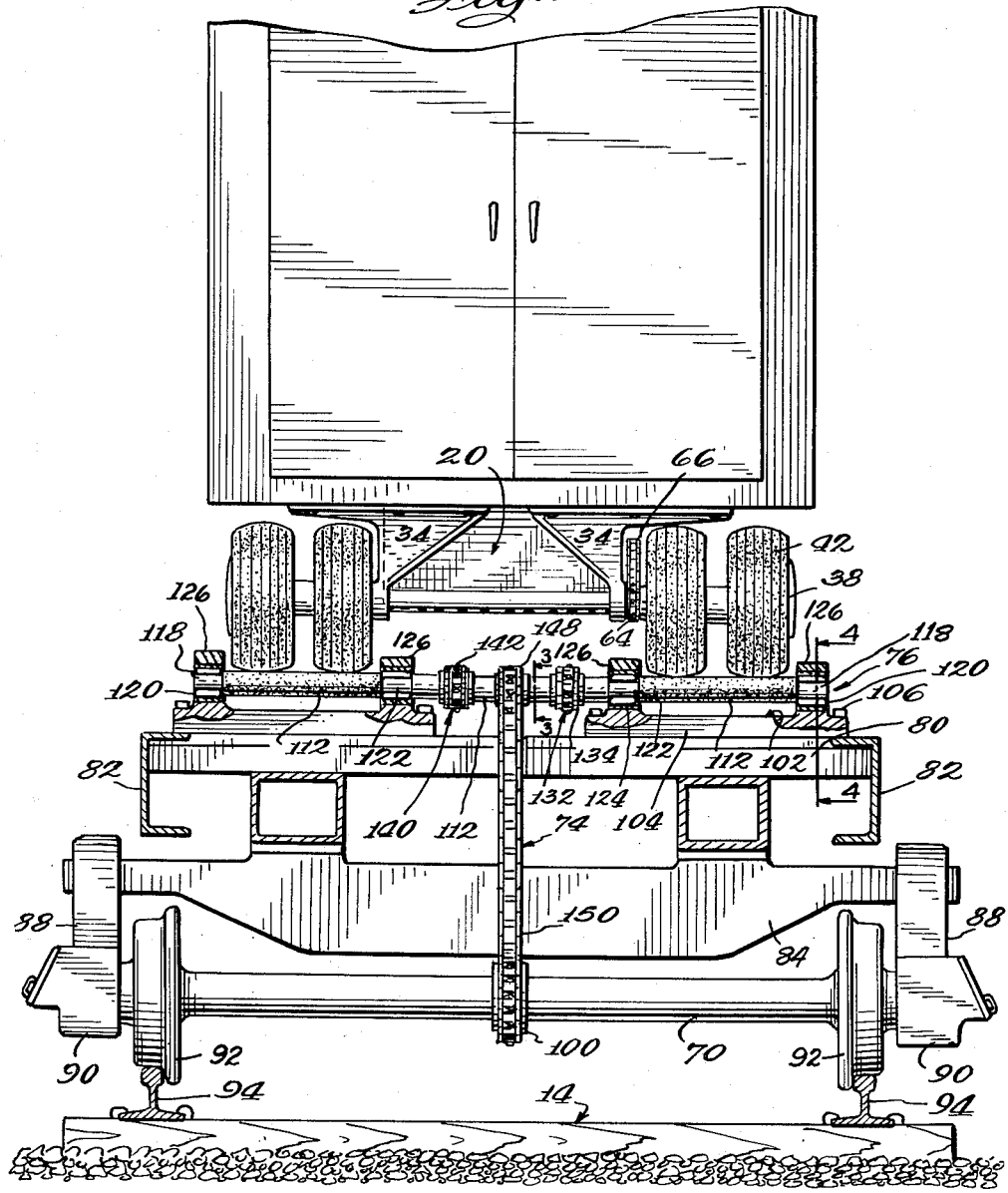

United States Patent Office 2,926,505
Patented Mar. 1, 1960

2,926,505
TRACTION DRIVE FOR RAILROAD-TRANS-
PORTED REFRIGERATOR TRAILERS

Effie E. White, Aurora, Ill.

Application August 21, 1958, Serial No. 756,349

4 Claims. (Cl. 62—242)

The present invention relates to a novel system of transportation for refrigerator trailers of the tractor-trailer combination type wherein mechanically refrigerated semi-trailers or trailers may be transported between widely separated geographical points by a combination of rail and truck transportation while maintaining the refrigeration apparatus associated with such trailers in effective operation during the entire time that the trailers are in transit whether the same be mobile or immobile. The invention is susceptible to modification and although it has been illustrated and described herein in connection with the transportation of mechanically refrigerated trailers, the system of the present invention may be employed in the transportation of other forms of mechanically refrigerated vehicles, for example, refrigerated trucks, vans and other forms of rolling stock having mechanically refrigerated enclosures. Irrespective, however, of the particular use to which the present invention may be put, the essential features thereof are at all times preserved.

A comparatively recent development in the railroad industry is the hauling of highway trailers on flatcars. This system of freight transportation is known as "piggy-back" freight transportation and involves scheduled operation whereby the railroad will deliver a trailer to a shipper who, after loading the trailer, engages a local contract hauler to transport the loaded trailer to the railroad freight terminal, utilizing a tractor or truck to haul the loaded trailer in the usual manner. By means of a special "piggy-back" ramp, the railroad loads the trailer bodily with its contents on a railroad flatcar with similarly loaded trailers, secures the trailer in position on the flatcar by special fastening devices, and transports the flatcar by rail to the destination terminal. At this latter terminal, the trailer is removed bodily from the flatcar and transported on the highway by a second local contract hauler to the consignee's shipping room dock for unloading purposes. By such a system, the goods undergoing shipping remain in the same vehicle enclosure from the time of loading thereof to the time of unloading so that intermediate handling charges are completely eliminated.

This system of freight transportation has proven highly successful for staples which require no refrigeration. However, where comestibles and other goods which, in the absence of refrigeration, are perishable are concerned, this "piggy-back" system of transportation has not yet proven practicable due to the lack of an effective and economical means for maintaining the refrigeration system of the trailer operative during either rail or highway transportation. Although it has been suggested that Dry Ice and wet ice bulk storage type refrigeration be resorted to in connection with trailers to enable the trailers to be handled on flatcars, the cost of such refrigeration and the unavailability of these refrigerant materials at outlying and interchange terminals has prevented the handling of comestibles by the "piggy-back" system. Furthermore, the highway transportation of comestibles and other perishable goods has, for lack of a source of power for mechanical refrigeration apparatus during highway hauling, confined the transportation of comestibles to mechanically refrigerated trucks, motor vans and other self-powered motor-driven vehicles.

Apart from the railroad transportation of perishable goods and considering only the highway transportation thereof, movement of such goods on the highway is confined substantially entirely to the use of mechanically refrigerated motor-driven vehicles which are self-powered and which are provided with power take-off means whereby power derived from the motor vehicle engine shaft is applied to the refrigeration compressor, fans and other moving parts of the mechanical refrigeration system. The sole exception is in the case of dry and wet ice bulk storage type of refrigeration. As in the case of railroad transportation of trailers, lack of a source of power for the refrigeration instrumentalities during highway transit is the cause of such a limitation. Although where mechanically refrigerated motor-driven vehicles are concerned, it is a comparatively easy matter to provide a power train from the driven shaft of the motor vehicle to the compressor and other moving parts of the refrigeration unit as evidenced by the patent to Ryan et al., No. 2,382,667, dated August 14, 1945 and entitled "Refrigeration System For Motor Vehicles," where detachable tractor-trailer combinations are concerned, the mechanism required to effect a detachable power train, part of which involves moving parts on the tractor and part of which involves moving parts on the trailer, has been prohibitive from a cost point of view. Additionally, a mechanically refrigerated trailer equipped with mechanism whereby the refrigeration compressor may be driven from a tractor requires that each time the trailer is in use it be hauled by a tractor having counterpart power train equipment. Still further, a refrigeration trailer so equipped is dependent upon the power supplied by its motor-driven hauling vehicle, or alternatively, upon the power obtained from a commercial power line of the 220 volt variety. Since neither of these sources is ordinarily available on moving railroad flatcars their use for "piggy-back" transportation systems has been, as heretofore stated, confined to the hauling of nonperishable goods.

The present invention is designed to overcome the above-noted limitations that are attendant upon the rail and highway transportation of comestibles and other perishable freight and to make feasible the "piggy-back" railroad transportation of such perishables in mechanically refrigerated trailers in the same manner that nonperishable goods are currently transported in flatcar-borne trailers. Briefly, in carrying out the invention, it is contemplated that in order to make available power for driving the refrigeration compressor and other moving instrumentalities of the mechanical refrigeration unit within the trailer, the latter be provided with a live axle and that a traction drive be established for the compressor of the refrigeration unit extending from such live axle. By such an arrangement, the refrigeration unit may be maintained in operation during travel of the trailer on the highway. The invention further contemplates the provision of a driving connection between the live axle of a railroad flatcar and the live axle of the mechanically refrigerated trailer when the latter is operatively mounted on the flatcar in "piggy-back" operation so that the traction-derived motion of the flatcar wheels may be applied to the compressor of the refrigeration unit when the flatcar is in transit.

The provision of a mechanically refrigerated trailer having a traction drive for the compressor of the refrigeration unit associated therewith, and the provision of a railroad flatcar having a traction drive capable of being coupled to the traction drive of such a mechanically refrigerated trailer being among the principal objects of the invention, another object is to provide a flatcar adapted to transport a mechanically refrigerated trailer wherein the coupling means between the flatcar traction drive and the trailer traction drive is in the form of a wheel-receiving cradle on the flatcar adapted to receive therein the trailer wheels associated with the live axle of the trailer, the cradle being comprised of a series of driving rollers which, when the flatcar is in motion, exert a tractional effect on the cradle-supported wheels at a plurality of circumferentially spaced regions therearound and establish a positive drive for the wheels.

Other objects and advantages of the invention, not at this time enumerated, will become readily apparent as the nature of the invention is better understood.

In the accompanying two sheets of drawings forming a part of this specification one exemplary form of the invention has been shown.

In these drawings:

Fig. 1 is a side elevational view, partly in section, of a railroad flatcar showing the same operatively disposed on a roadbed and having a mechanically refrigerated highway trailer designed for use in a tractor-trailer combination fixedly mounted thereon, the flatcar and trailer being equipped with the novel traction drive mechanism of the present invention;

Fig. 2 is an enlarged sectional view taken substantially along the line 2—2 of Fig. 1;

Fig. 3 is an enlarged sectional view taken substantially along the line 3—3 of Fig. 2; and Fig. 4 is a sectional view taken substantially along the line 4—4 of Fig. 2.

Referring now to the drawings in detail and in particular to Fig. 1, a mechanically refrigerated trailer of the type employed in tractor-trailer combinations is designated in its entirety at 10 and is shown as being operatively mounted on a railway flatcar 12, the latter being disposed on a railway roadbed 14. The trailer 10 is in the form of a conventional trailer vehicle which has been modified only to the extent that it embodies an internal refrigeration enclosure or compartment 16 within which comestibles or other perishables are adapted to be loaded. The trailer 10 is provided with refrigeration apparatus including an evaporator assembly 18, a condenser-compressor assembly 20, and a live axle 22 which, according to the present invention, is employed as a source of power for actuating the refrigeration apparatus, all in a manner that will be made clear presently.

Accordingly, the trailer 10 includes the usual trailer floor or deck 24, a sub-floor 26 from which the condenser-compressor unit 20 is suspended, insulated side and end walls 28 and 30, respectively, and an insulated roof 32. The sub-floor 26 constitutes the bottom wall of the refrigeration enclosure 16. The trailer further includes an underneath journal support 34 in which there is rotatably journalled the live axle 22, together with a dead axle 36, the live axle carrying wheels 38 and the dead axle carry wheels 40. The various wheels have mounted thereon pneumatic rubber tires 42.

The component units 18 and 20 of the refrigeration apparatus have been illustrated in Fig. 1 in schematic fashion, it being understood that this apparatus is of conventional construction, which is to say that it is of the condenser-evaporator-compressor type. The unit 18 includes the evaporator heat exchange device 44 and its associated impeller or fan 46, while the unit 20 includes a condenser 48 and compressor 50. An electric motor 52 is embodied in the unit 20 and has a motor shaft 54 operatively connected through a suitable clutch mechanism 55 by a belt and pulley arrangement 56 to the drive shaft 58 of the compressor 50. The motor 52 is adapted to be energized from an available source of electric current when the trailer is immobile at a terminal, railroad siding, garage, filling station or other intermediate point in its itinerary. When the electric motor 52 is not in use, the motor shaft 54 constitutes a power input shaft for the unit 20 from which the drive shaft 58 for the compressor 50 may be driven through the previously mentioned belt and pulley arrangement 56 with the motor armature idling ineffectively.

It will be understood that various types of refrigeration apparatus may be employed for refrigerating the enclosure 16 and that the apparatus illustrated herein is purely exemplary of one form of apparatus which may be employed. For a more detailed illustration and description of the herein schematically disclosed refrigeration apparatus, reference may be had to the patent to Eldon F. Miller, No. 2,910,840, dated November 3, 1959, and entitled "Motor Driven Vehicles With Refrigeration Apparatus." It is deemed sufficient for purposes of disclosure herein to state that regardless of the specific form of refrigeration apparatus employed for refrigerating the enclosure 16, such apparatus will invariably be provided with an input shaft corresponding to the shaft 54 and by means of which shaft the compressor of the system will be driven, either directly or through a suitable power train.

Referring now additionally to Figs. 2 and 3, the live axle 22 is operatively connected in driving relationship to the input shaft 54 of the refrigeration apparatus by means of a chain and sprocket assembly including sprockets 62 and 64 on the shaft 54 and axle 22, respectively, and a connecting chain 66. It will be seen from the above description that during travel of the trailer 10 in transit on a highway, the frictionally or tractionally driven wheels 38 on the live axle will impart rotational motion to the axle which, in turn, will effect rotation of the refrigeration input shaft 54 through the medium of the chain and sprocket mechanism 62, 64, 66. By such an arrangement, the refrigeration system may be maintained in effective operation and the enclosure 16 refrigerated solely under the influence of forward motion of the trailer and entirely independent of any driving connection with the motivating vehicle or tractor.

In order to operate the refrigeration system when the trailer 10 is rail-transported on a flatcar such as the flatcar 12, according to the present invention, the flatcar is provided with a plurality of live axles 70 one of which is operatively connected through a chain and sprocket mechanism 74 to a roller-cradle assembly 76 adapted to support therein the various wheel assemblies 38. More specifically, the flatcar 12 which is of conventional design embodies a car body including a platform or car deck 80 having side channels 82 and supported on a chassis 84 supported on truck side frames 88. The side frames 88 are integrally cast with suitable journal boxes 90 into which the axle journals of the various live axles 70 of the flatcar extend. Each axle 70 is provided with the usual flanged traction wheels 92 which are supported on the rails 94 of the roadbed 14.

In the form of flatcar illustrated herein for exemplary purposes, the car trucks are of the dual axle type, there being four such axles. The paritcular axle 70 selected for power take-off purposes is the inside axle of the rear car truck although it will be understood that any one of the four car axles may be selected if desired. The axle 70 has centrally mounted thereon a driving sprocket 100 which may be of the split section type and which constitutes one element of the previously mentioned chain and sprocket mechanism 72.

The roller cradle assembly 76 involves in its general organization a pair of base castings 102 of identical construction, each casting comprising a base portion 104 which may be secured by anchoring screws 106 to the car deck 80 and which is provided with inner and outer integral spaced parallel upstanding side flanges 108 which constitute journal supports for a series of three elongated, parallel, horizontally extending, drivingly interconnected traction rollers 112, 114 and 116 (Fig. 3) which extend transversely of the flatcar 12 and substantially span the two base castings 102, as best seen in Fig. 2. Each roller is in the form of a shaft having reduced ends 118 rotatably journalled in roller bearings 120 mounted in the outside flanges 108 and having reduced medial portions 122 rotatably journalled in roller bearings 124 mounted in the inside flanges 108. The various bearings 120 and 124 are removably mounted in position on their respective supporting flanges 108 and 110 by means of cap members 126 (Fig. 4) removably secured to the flanges 108 by means of cap screws 128.

The three rollers 112, 114 and 116 are so disposed relative to one another that their axes of rotation extend in parallelism on centers which are arranged in arcuate fashion on an arc having a radius of curvature approximately equal to the overall radius of curvature of the trailer wheels 38 including the tires 42 thereon when the latter are normally inflated. The distance between the sides flanges 108 of each base casting 104 is somewhat greater than the overall width of the dual-wheel assemblies embodying the wheels 38 and 36 so that the trailer 10 may be supported on the flatcar 12 with the four wheels 38 "cradled," so to speak, tractionally on the three rollers 112, 114 and 116 and with the treads of the various tires 42 making tangential contact with all three of the rollers as best seen in Fig. 3. In order to enhance the frictional or traction engagement between the tire treads and the rollers, each roller may be provided with encompassing sheathes or sleeves 130 of friction material such as rubber, or a rubber-impregnated fabric, the sleeves 130 being axially spaced on the rollers in vertical register with the various wheels 38.

In order to drivingly interconnect the three rollers 112, 114 and 116 for rotation in unison in the same direction, a first chain and sprocket assembly 132 extends between the rollers 112 and 116 and includes sprockets 134 and 136 connected by a chain 138. A second chain and sprocket assembly 140 extends between the rollers 112 and 114 and includes sprockets 142 and 144 connected by a chain 146. The driving sprocket 100 on the live axle 70 is operatively connected to a driven sprocket 148 by a chain 150.

From the above description, it will be seen that during forward motion of the flatcar 12 on the rails 94 of the roadbed 14, the roary motion of the live axle 70 will be translated through the various chain and sprocket mechanisms 74, 132 and 140 to the three cradle rollers 112, 114 and 116. These rollers will rotate in the same direction and, because each of them is in engagement with the treads on the various wheels 38, the latter will be driven in the opposite direction and the rotary motion of the live axle 22 on which they are mounted will be translated to the input shaft 54 of the refrigeration unit 20.

In order to anchor the trailer 10 in operative position on the flatcar 10 so that the traction wheels 38 thereof are in operative position within the roller-cradles 76, chain and turnbuckle assemblies 152 are fastened to the end regions of the trailer and flatcar decks 24 and 80, respectively. Additionally, a magnetic chuck device including a retractable armature 154 and a magnet 156 may be provided for further stabilizing the trailer body on the flatcar 12. To still further stabilize the trailer body, as well as well as to prevent free rotation of the floating wheels 36, clamping devices 158 in the form of rim clamps having block portions 160 and cap portions 162 which overhang a portion of the wheel rims 164 are secured by clamping screws 164 to the base portion 104 of the base castings 102.

From the above description, it will be seen that when the trailer 10 is mobile, either by virtue of its being hauled on a highway or of its being transported bodily on the flatcar 12, rotary motion of the live axle 22 associated therewith will be effective to drive the input shaft 54 of the refrigeration unit 20 through the medium of the clutch 55 and chain and sprocket power train 66.

The invention is not to be limited to the exact arrangement of parts shown in the accompanying drawings or described in this specification since various changes in the details of construction may be resorted to without departing from the spirit of the invention. Only insofar as the invention has particularly been pointed out in the accompanying claims is the same to be limited.

Having thus described the invention what I claim as new and desire to secure by Letters Patent is:

1. In a railroad flatcar having a frame carrying a supporting deck on which there is adapted to be supported a motor vehicle trailer having a traction wheel operable upon rotation thereof to effect rotation of the power input shaft of a refrigeration unit operably associated with the trailer, a bearing support mounted on said deck, a traction roller rotatably journalled in said bearing support, a live axle rotatably mounted on said frame, a rail-engaging traction wheel mounted on said live axle, a power train operatively connecting said live axle and said traction roller for translating the rotational movement of the axle into rotational movement of the traction roller, and means for fixedly securing said trailer in position on said supporting deck with the traction wheel of the trailer in frictional contact with said traction roller whereby rotational movement of the traction roller in one direction will effect rotational movement of the trailer traction wheel in the opposite direction.

2. In a railroad flatcar, the combination set forth in claim 1 wherein said power train comprises a sprocket mounted on said live axle, a sprocket mounted on said transaction roller, and a driving chain passing over and common to said sprockets.

3. In a railroad flatcar, the combination set forth in claim 1 wherein said securing means for the trailer serves to maintain the trailer traction wheel in vertical register with said traction roller with the weight of said traction wheel and the portion of the trailer normally supported by the traction wheel resting gravitationally on the roller.

4. In a railroad flatcar, the combination set forth in claim 3 wherein said securing means for the trailer comprises a linkage mechanism having a turnbuckle operatively interposed therein.

References Cited in the file of this patent

UNITED STATES PATENTS

| | | |
|---|---|---|
| 1,880,126 | Fageol | Sept. 27, 1932 |
| 1,911,958 | Kellett | May 30, 1933 |
| 2,091,594 | Innes | Aug. 31, 1937 |